United States Patent
Chandrashekar et al.

(10) Patent No.: US 12,432,806 B2
(45) Date of Patent: Sep. 30, 2025

(54) INACTIVE USER EQUIPMENT VERIFICATION FOR DATA TRANSMISSION IN COMMUNICATION NETWORK

(71) Applicant: Nokia Technologies Oy, Espoo (FI)

(72) Inventors: Subramanya Chandrashekar, Bangalore (IN); Daniela Laselva, Klarup (DK); Suresh P. Nair, Whippany, NJ (US); Philippe Godin, Versailles (FR)

(73) Assignee: Nokia Technologies Oy, Espoo (FI)

( * ) Notice: Subject to any disclaimer, the term of this patent is extended or adjusted under 35 U.S.C. 154(b) by 451 days.

(21) Appl. No.: 17/877,230

(22) Filed: Jul. 29, 2022

(65) Prior Publication Data

US 2023/0037332 A1    Feb. 9, 2023

(30) Foreign Application Priority Data

Aug. 3, 2021    (IN) .............................. 202141034948

(51) Int. Cl.
*H04W 76/19* (2018.01)
*H04W 12/041* (2021.01)
*H04W 12/0431* (2021.01)
*H04W 12/06* (2021.01)

(52) U.S. Cl.
CPC ......... *H04W 76/19* (2018.02); *H04W 12/041* (2021.01); *H04W 12/0431* (2021.01); *H04W 12/06* (2013.01)

(58) Field of Classification Search
CPC .............. H04W 76/19; H04W 12/041; H04W 12/0431; H04W 12/06; H04W 76/27; H04W 12/069
See application file for complete search history.

(56) References Cited

U.S. PATENT DOCUMENTS

| | | | |
|---|---|---|---|
| 2015/0163056 A1* | 6/2015 | Nix ...................... | H04B 1/3816 |
| 2016/0174070 A1* | 6/2016 | Wager ................... | H04L 9/0869 |
| | | | 380/270 |
| 2016/0255070 A1* | 9/2016 | Näslund ............. | H04L 63/0869 |
| | | | 713/171 |
| 2017/0289797 A1* | 10/2017 | Bae ........................ | H04L 9/0869 |
| 2018/0007552 A1* | 1/2018 | Bae ........................ | H04L 63/083 |
| 2018/0270654 A1* | 9/2018 | Rajadurai ............. | H04W 76/16 |
| 2019/0387401 A1* | 12/2019 | Liao ........................ | H04W 4/08 |
| 2020/0021978 A1* | 1/2020 | Chai ...................... | H04W 76/27 |
| 2020/0137564 A1* | 4/2020 | Liu ........................ | H04W 36/08 |

(Continued)

OTHER PUBLICATIONS

Qualcomm Incorporated, "RACH based uplink small data transmission with or without anchor relocation," 3GPP TSG-RAN WG2 Meeting #111e, R2-2007541, Online, Aug. 17-28, 2020, pp. 1-4. (Year: 2020).*

(Continued)

*Primary Examiner* — Atique Ahmed
(74) *Attorney, Agent, or Firm* — Ryan, Mason & Lewis, LLP

(57) ABSTRACT

Techniques are disclosed for verification of user equipment (UE) for small data transmission (SDT) when the user equipment is in an inactive state with respect to a communication network. For example, the UE is verified at a selected target gNB upon an SDT resume request initiated by the UE, i.e., a returning UE with respect to the selected target gNB, or otherwise prior to UE data resuming transmission to an anchor gNB from the selected target gNB.

20 Claims, 13 Drawing Sheets

(56) References Cited

U.S. PATENT DOCUMENTS

| | | | |
|---|---|---|---|
| 2021/0022109 A1* | 1/2021 | Kim | H04W 76/27 |
| 2021/0058771 A1* | 2/2021 | Wu | H04L 9/0861 |
| 2021/0258777 A1* | 8/2021 | Liu | H04W 36/0038 |
| 2022/0232659 A1* | 7/2022 | Kim | H04W 72/23 |
| 2022/0248493 A1* | 8/2022 | Kim | H04W 76/25 |
| 2023/0262815 A1* | 8/2023 | Agiwal | H04W 74/0841 |

OTHER PUBLICATIONS

3GPP, "3rd Generation Partnership Project; Technical Specification Group Radio Access Network; NG-RAN; Xn Application protocol (XnAP) (Release 17)" 3GPP TS 38.423, V17.1.0, Jun. 2022, 613 pages.

3GPP, "3rd Generation Partnership Project; Technical Specification Group Radio Access Network; NG-RAN; F1 application protocol (F1AP) (Release 17)" 3GPP TS 38.473, V17.1.0, Jun. 2022, 667 pages.

3GPP, "3rd Generation Partnership Project; Technical Specification Group Services and System Aspects; Security Architecture and Procedures for 5G System (Release 15)" 3GPP TS 33.501, V15.1.0, Jun. 2018, 152 pages.

3Gpp, "3rd Generation Partnership Project; Technical Specification Group Radio Access Network; NR; NR and NG-RAN Overall Description; Stage 2 (Release 16)" 3GPP TS 38.300, V16.6.0, Jun. 2021, 152 pages.

3GPP, "3rd Generation Partnership Project; Technical Specification Group Radio Access Network; NR; Radio Resource Control (RRC) Protocol Specification (Release 15)," 3GPP TR 38.331, V15.3.0, Sep. 2018, 445 pages.

3GPP, "3rd Generation Partnership Project; Technical Specification Group Radio Access Network; Evolved Universal Terrestrial Radio Access (E-UTRA); Radio Resource Control (RRC); Protocol specification (Release 17)" 3GPP TS 36.331, V17.1.0, Jun. 2022, 1128 pages.

3GPP, "3rd Generation Partnership Project; Technical Specification Group Services and System Aspects; Feasibility Study on New Services and Markets Technology Enablers; Stage 1 (Release 14)" 3GPP TS 22.891, V14.20, Sep. 2016, 95 pages.

3GPP, "3rd Generation Partnership Project; Technical Specification Group Services and System Aspects; System Architecture for the 5G System (5GS); Stage 2 (Release 16)" 3GPP TS 23.501, V16.5.0, Jul. 2020, 441 pages.

3GPP, "3rd Generation Partnership Project; Technical Specification Group Services and System Aspects; Procedures for the 5G System (5GS); Stage 2 (Release 16)" 3GPP TS 23.502, V16.3.0, Dec. 2019, 558 pages.

* cited by examiner

FIG. 7A

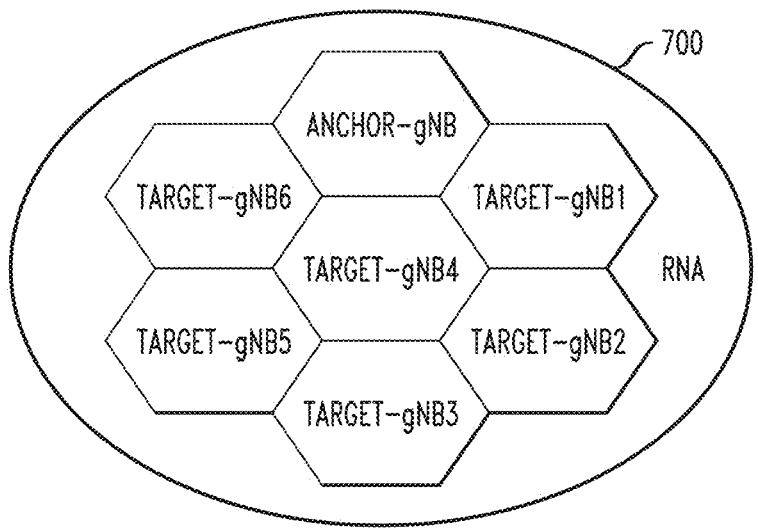

FIG. 7B

```
ANCHOR-gNB → TARGET-gNB1 (UE1-RNTI, KRRC-INT1, SEC
                         ALGORITHM PARAMTERS)
ANCHOR-gNB → TARGET-gNB2 (UE1-RNTI, KRRC-INT2, SEC
                         ALGORITHM PARAMTERS)
ANCHOR-gNB → TARGET-gNB3 (UE1-RNTI, KRRC-INT3, SEC
                         ALGORITHM PARAMTERS)
ANCHOR-gNB → TARGET-gNB4 (UE1-RNTI, KRRC-INT4, SEC
                         ALGORITHM PARAMTERS)
ANCHOR-gNB → TARGET-gNB5 (UE1-RNTI, KRRC-INT5, SEC
                         ALGORITHM PARAMTERS)
ANCHOR-gNB → TARGET-gNB6 (UE1-RNTI, KRRC-INT6, SEC
                         ALGORITHM PARAMTERS)
```

FIG. 7C

```
ANCHOR-gNB ..................... → UE
(UE1-RNTI, SECURITY PARAMETERS FOR KEY GENERATION AT ANY TARGET
                    gNB WITHIN THE RNA)
```

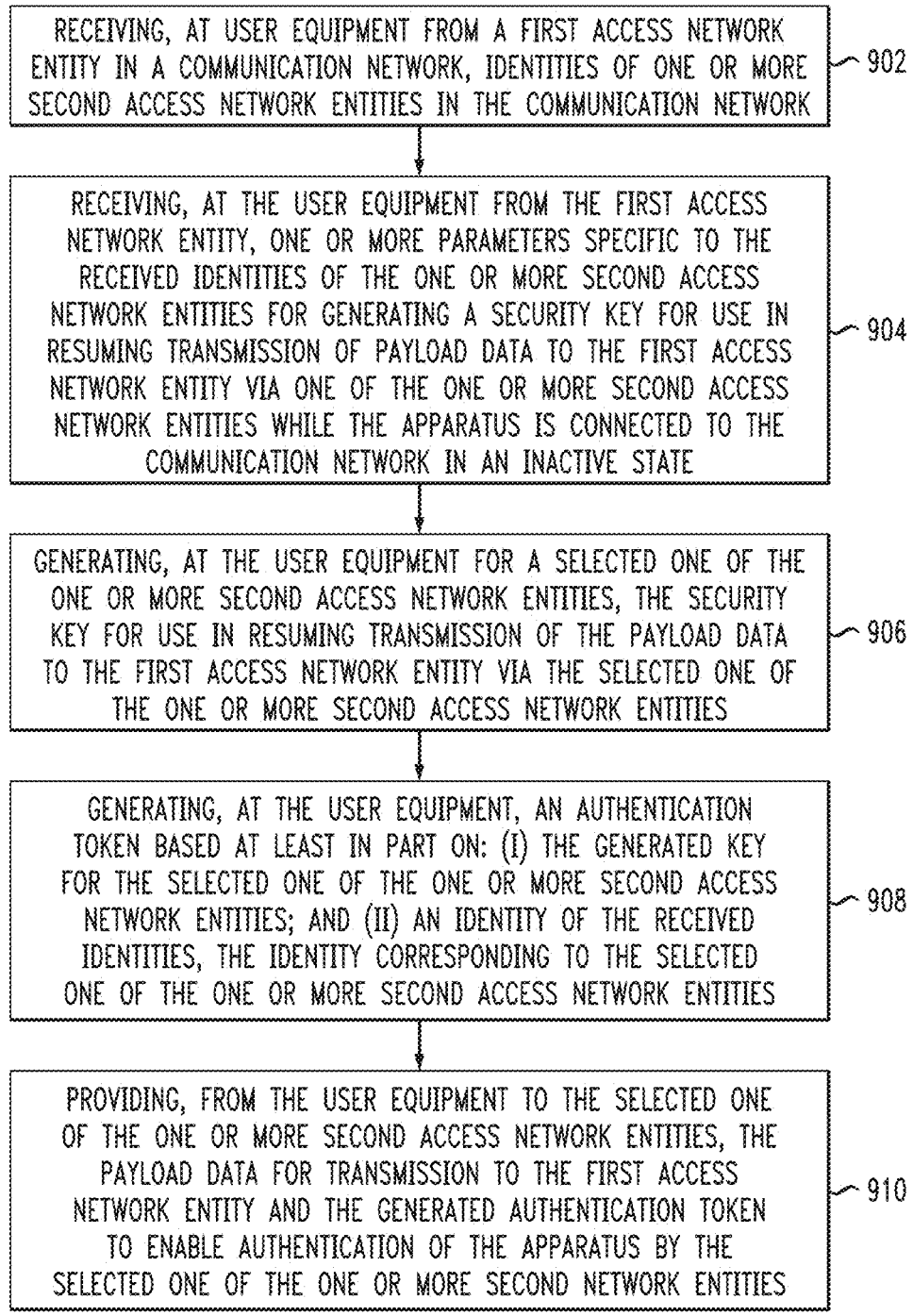

*FIG. 9B* ⟋920

```
┌─────────────────────────────────────────────────────────────┐
│ GENERATING, AT A FIRST ACCESS NETWORK ENTITY OF A COMMUNICATION │
│ NETWORK FOR USER EQUIPMENT IN THE COMMUNICATION NETWORK, ONE OR │
│ MORE SECURITY KEYS CORRESPONDING TO ONE OR MORE SECOND ACCESS │
│ NETWORK ENTITIES FOR USE IN RESUMING TRANSMISSION OF PAYLOAD DATA │
│ TO A FIRST ACCESS NETWORK ENTITY IN THE COMMUNICATION NETWORK, │
│ EACH OF THE ONE OR MORE SECURITY KEYS BEING ASSOCIATED WITH USER │
│ EQUIPMENT IN THE COMMUNICATION NETWORK AND A SELECTED ONE OF THE │─922
│ ONE OR MORE SECOND ACCESS NETWORK ENTITIES IN THE COMMUNICATION │
│ NETWORK AND BEING UTILIZABLE FOR RESUMING TRANSMISSION OF THE │
│ PAYLOAD DATA TO THE FIRST ACCESS NETWORK ENTITY IN THE │
│ COMMUNICATION NETWORK VIA THE SELECTED ONE OF THE ONE OR MORE │
│ SECOND ACCESS NETWORK ENTITIES WHILE THE USER EQUIPMENT IS │
│ CONNECTED TO THE COMMUNICATION NETWORK IN AN INACTIVE STATE │
└─────────────────────────────────────────────────────────────┘
                              ↓
┌─────────────────────────────────────────────────────────────┐
│ PROVIDING, TO THE USER EQUIPMENT, IDENTITIES OF THE ONE OR MORE │
│ SECOND ACCESS NETWORK ENTITIES AND ONE OR MORE PARAMETERS FOR │─924
│ DERIVING THE ONE OF THE ONE OR MORE SECURITY KEYS ASSOCIATED │
│ WITH EACH OF THE ONE OR MORE SECOND ACCESS NETWORK ENTITIES │
└─────────────────────────────────────────────────────────────┘
                              ↓
┌─────────────────────────────────────────────────────────────┐
│ PROVIDING, TO AT LEAST ONE OF THE ONE OR MORE SECOND ACCESS │
│ NETWORK ENTITIES, THE GENERATED SECURITY KEY FOR SAID AT LEAST ONE │─926
│ OF THE ONE OR MORE SECOND ACCESS NETWORK ENTITIES AND AN IDENTITY │
│ OF THE USER EQUIPMENT ASSOCIATED WITH THE GENERATED SECURITY KEY │
└─────────────────────────────────────────────────────────────┘
```

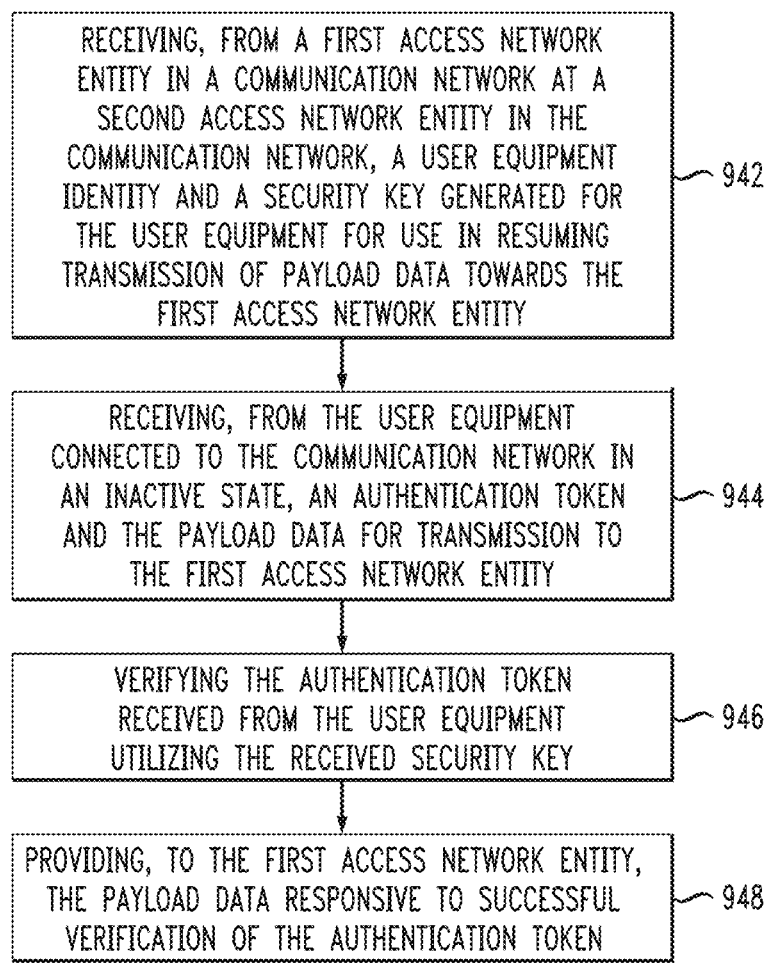

INACTIVE USER EQUIPMENT VERIFICATION FOR DATA TRANSMISSION IN COMMUNICATION NETWORK

FIELD

The field relates generally to communication networks, and more particularly, but not exclusively, to security management in such communication networks.

BACKGROUND

This section introduces aspects that may be helpful in facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point of an access network referred to as a 5G AN in a 5G network. The access point (e.g., gNB) is illustratively part of an access network of the communication system. For example, in a 5G network, the radio access network referred to as a 5G RAN is described in 5G Technical Specification (TS) 23.501, entitled "Technical Specification Group Services and System Aspects; System Architecture for the 5G System," and TS 23.502, entitled "Technical Specification Group Services and System Aspects; Procedures for the 5G System (5GS)," the disclosures of which are incorporated by reference herein in their entireties. In general, the access point (e.g., gNB) provides access for the UE to a core network (CN or 5GC), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, entitled "Technical Specification Group Services and System Aspects; Security Architecture and Procedures for the 5G System," the disclosure of which is incorporated by reference herein in its entirety, further describes security management details associated with a 5G network.

Security management is an important consideration in any communication system. However, due to continuing attempts to improve the architectures and protocols associated with a 5G network in order to increase network efficiency and/or subscriber convenience, security management issues associated with user equipment can present a significant challenge.

SUMMARY

Illustrative embodiments provide improved techniques for verification of user equipment for data transmission when the user equipment is in an inactive state with respect to a communication network.

For example, in one illustrative embodiment, a method comprises receiving, from a first access network entity in a communication network, identities of one or more second access network entities in the communication network. The method also receives, from the first access network entity, one or more parameters specific to the received identities of the one or more access second network entities for generating a security key for use in resuming transmission of payload data to the first access network entity via one of the one or more second access network entities while the apparatus is connected to the communication network in an inactive state. The method then generates, for a selected one of the one or more second access network entities, the security key for use in resuming transmission of the payload data to the first access network entity via the selected one of the one or more second access network entities. The method also generates an authentication token based at least in part on: (i) the generated key for the selected one of the one or more second access network entities; and (ii) an identity of the received identities corresponding to the selected one of the one or more second access network entities. The method provides, to the selected one of the one or more second network entities, the payload data for transmission to the first network entity and the generated authentication token to enable authentication of the apparatus by the selected one of the one or more second network entities.

In another illustrative embodiment, a method comprises generating, at a first access network entity of a communication network for user equipment in the communication network, one or more security keys corresponding to one or more second access network entities for use in resuming transmission of payload data to a first access network entity in the communication network, each of the one or more security keys being associated with user equipment in the communication network and a selected one of the one or more second access network entities in the communication network and being utilizable for resuming transmission of the payload data to the first access network entity in the communication network via the selected one of the one or more second access network entities while the user equipment is connected to the communication network in an inactive state. The method provides, to the user equipment, identities of the one or more second access network entities and one or more parameters for deriving the one of the one or more security keys associated with each of the one or more second access network entities. The method provides, to at least one of the one or more second access network entities, the generated security key for said at least one of the one or more second access network entities and an identity of the user equipment associated with the generated security key.

In yet another illustrative embodiment, a method comprises receiving, from a first access network entity in a communication network, a user equipment identity and a security key generated for the user equipment for use in resuming transmission of payload data towards the first access network entity. The method receives, from the user equipment connected to the communication network in an inactive state, an authentication token and the payload data for transmission to the first access network entity. The method verifies the authentication token received from the user equipment utilizing the received security key, and provides, to the first access network entity, the payload data responsive to successful verification of the authentication token.

Further illustrative embodiments are provided in the form of a non-transitory computer-readable storage medium having embodied therein executable program code that when executed by a processor causes the processor to perform the above steps. Still further illustrative embodiments comprise apparatus with a processor and a memory configured to perform the above steps.

Advantageously, in a 5G NR network environment, illustrative embodiments enable user equipment (UE) in a Radio Resource Control (RRC) inactive state to perform Small Data Transmission (SDT) without anchor relocation. In such embodiments, the first access network entity comprises an anchor gNB, and the one or more second access network entities comprise one or more target gNBs. More particularly, in accordance with illustrative embodiments, the UE is verified at a selected target gNB upon an SDT resume request initiated by the UE, i.e., a returning UE with respect to the selected target gNB, or otherwise prior to UE data resuming transmission to an anchor gNB from the selected target gNB.

These and other features and advantages of embodiments described herein will become more apparent from the accompanying drawings and the following detailed description.

BRIEF DESCRIPTION OF THE DRAWINGS

FIGS. 7A-7C collectively illustrate proactive distribution of derived security keys by an anchor base station to potential target base stations according to an illustrative embodiment.

FIGS. 9A-9C collectively further illustrate small data transmission with a signaling protocol according to an illustrative embodiment.

DETAILED DESCRIPTION

Figure 1:
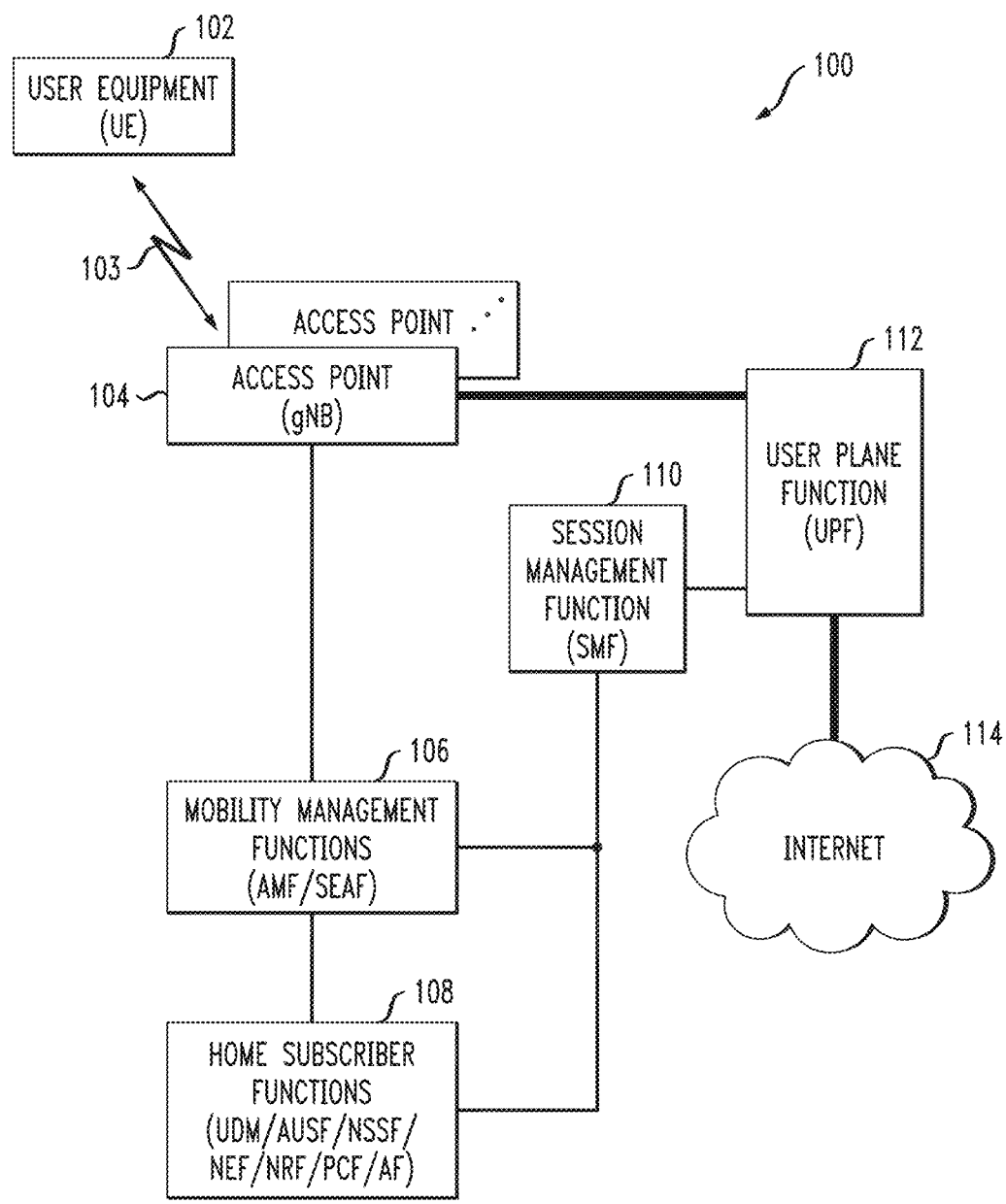
FIG. 1 illustrates a communication system with which one or more illustrative embodiments may be implemented.

Embodiments will be illustrated herein in conjunction with example communication systems and associated techniques for security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) may provide further explanation of network elements/functions and/or operations that may interact with parts of the inventive solutions, e.g., the above-referenced 3GPP TS 23.501 and 3GPP TS 33.501. Other 3GPP TS/TR documents may provide other details that one of ordinary skill in the art will realize. For example, TS 22.891, entitled "Technical Specification Group Services and System Aspects; Feasibility Study on New Services and Markets Technology Enablers; Stage 1," TS 38.300, entitled "Technical Specification Group Radio Access Network; NR; NR and NG-RAN Overall Description; Stage 2," TS 38.331, entitled "Technical Specification Group Radio Access Network; NR; Radio Resource Control (RRC) Protocol Specification," and TS 36.331, entitled "Technical Specification Group Radio Access Network; Evolved Universal Terrestrial Radio Access (E-UTRA); Radio Resource Control (RRC); Protocol Specification," the disclosures of which are incorporated by reference herein in their entireties, may also be mentioned below in the context of some illustrative embodiments. Illustrative embodiments may also be applicable to TS 38.423, entitled "Technical Specification Group Radio Access Network; NG-RAN; Xn application protocol (XnAP);" and TS 38.473, entitled "Technical Specification Group Radio Access Network; NG-RAN; F1 application protocol (F1AP);" the disclosures of which are incorporated by reference herein in their entireties. However, while well-suited for 5G-related 3GPP standards, embodiments are not necessarily intended to be limited to any particular standards.

Furthermore, as illustratively used herein, various abbreviations will be referenced including, but not limited to, the following:

CG: Configured Grant
CU: Centralized Unit
CU-CP: Centralized Unit-Control Plane
CU-UP: Centralized Unit-User Plane
DU: Distributed Unit
EDT: Early Data Transmission
FR1: Frequency Range 1
FR2: Frequency Range 2
EDT: Early Data Transmission
KRRCint: Key for RRC Integrity Protection
MAC-I: Message Authentication Code-Integrity
PCG: Pre-configured Grant
PCI: Physical Cell Identity
PRACH: Physical Random Access Channel
PRB: Physical Resource Block
PSS: Primary Synchronization Signal
PUR: Periodic Uplink Resources
PUSCH: Physical Uplink shared channel
RA: Random Access
RACH: Random Access Channel RA-SDT: Random Access based Small Data Transmission
RNTI: Radio Network Temporary Identifier.
RO: RACH Occasion
RRC: Radio Resource Control
RSRP: Reference Signal Received Power
SDT: Small Data Transmission
SI: System Information
SIB: System Information Block
SSB: Synchronization Signal block
SSS: Secondary Synchronization Signal
TA: Timing Advance
UE: User Equipment Prior to describing illustrative embodiments, a general description of certain main components of a 5G network will be described below in the context of FIGS. 1 and 2.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used to implement some or all of the main functions represented. Also, it is to be understood that not all functions of a 5G network are depicted in FIG. 1. Rather, at least some functions that facilitate an explanation of illustrative embodiments are represented. Subsequent figures may depict some additional elements/functions (i.e., network entities).

Accordingly, as shown, communication system 100 comprises user equipment (UE) 102 that communicates via an air interface 103 with an access point (gNB) 104. It is to be understood that UE 102 may use one or more other types of access points (e.g., access functions, networks, etc.) to communicate with the 5G core other than a gNB. By way of example only, the access point 104 may be any 5G access network such as an N3IWF (Non-3GPP Interworking Function), a TNGF (Trusted Non-3GPP Gateway Function) or a W-AGF (Wireline Access Gateway Function) or may correspond to a legacy access point (e.g., eNB).

The UE 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores a permanent subscription identifier and its related key, which are used to uniquely identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) unique to the UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as Subscription Concealed Identifier (SUCI). Another example of a SUPI uses a Network Access Identifier (NAI). NAI is typically used for IoT communication.

Access point 104 is illustratively part of a radio access network of the communication system 100. Such an access network may comprise, for example, a 5G System having a plurality of base stations and one or more associated radio network control functions. The base stations and radio network control functions may be logically separate entities, but in a given embodiment may be implemented in the same physical network element, such as, for example, a base station router or cellular access point.

Further, a given access point such as a 5G gNB can be designated as an anchor gNB or a target gNB. An anchor gNB is the gNB to which the UE is connected while a target gNB can conceivably be any gNB that is not the anchor gNB for a UE. Thus, as depicted in FIG. 1 for communication system 100, there can be multiple available access points 104 wherein one acts as an anchor gNB while others are available as target gNBs for when UE 102 roams from the geographic area served by the anchor gNB.

Still further, in some embodiments, access point 104 may be implemented with a disaggregated RAN architecture with components such as a Centralized Unit (CU) and a Distributed Unit (DU). CU provides support for the higher layers of the protocol stack such as Radio Resource Control (RRC), Service Data Adaptation Protocol (SDAP) and Packet Data Convergence Protocol (PDCP), while DU provides support for the lower layers of the protocol stack such as Media Access Control (MAC), Radio Link Control (RLC), and Physical layer (PHY). CU is also partitioned into one or more user plane components (CU-UP) and one or more control plane components (CU-CP).

Access point 104 may also be generally referred to as an "access network entity" as it is part of a RAN or otherwise part of an overall communication network (e.g., communication system 100) that is considered to encompass the RAN and a Core Network (CN), as generally explained below.

As further generally illustrated in FIG. 1, access point 104 in this illustrative embodiment is operatively coupled to mobility management functions 106. In a 5G network, the mobility management function is implemented by an Access and Mobility Management Function (AMF). A Security Anchor Function (SEAF) can also be implemented with the AMF connecting a UE with the mobility management function. A mobility management function, as used herein, is the element or function (i.e., entity) in the CN part of the communication system that manages or otherwise participates in, among other network operations, access and mobility (including authentication/authorization) operations with the UE (through the access point 104). The AMF may also be referred to herein, more generally, as an access and mobility management entity.

The AMF 106 in this illustrative embodiment is operatively coupled to other network functions 108. As shown, some of these other network functions 108 include, but are not limited to, Unified Data Management (UDM) function, as well as an Authentication Server Function (AUSF). The AUSF and UDM (separately or collectively) may also be referred to herein, more generally, as an authentication entity. In addition, other functions 108 may include, but are not limited to, Network Slice Selection Function (NSSF), Network Exposure Function (NEF), Network Repository Function (NRF), Policy Control Function (PCF), and Application Function (AF). Also, network functions 108 can include network functions that can act as service producers (NFp) and/or service consumers (NFc). Note that any network function can be a service producer for one service and a service consumer for another service. Further, when the service being provided includes data, the data-providing NFp is referred to as a data producer, while the data-requesting NFc is referred to as a data consumer. A data producer may also be an NF that generates data by modifying or otherwise processing data produced by another NF.

Note that a UE, such as UE 102, is typically subscribed to what is referred to as a Home Public Land Mobile Network (HPLMN) in which some or all of the functions 106 and 108 reside. The HPLMN is also referred to as the Home Environment (HE). If the UE is roaming (not in the HPLMN), it is typically connected with a Visited Public Land Mobile Network (VPLMN) also referred to as a visited or serving network. In such case, some of the network functions 106 and 108 can reside in the VPLMN, in which case, functions in the VPLMN communicate with functions in the HPLMN as needed. However, in a non-roaming scenario, mobility management functions 106 and the other network functions 108 reside in the same communication network, i.e. HPLMN. Embodiments described herein are not limited by which functions reside in which PLMN (i.e., HPLMN or VPLMN).

Access point 104 is also operatively coupled (via one or more of functions 106 and/or 108) to a serving gateway function, i.e., Session Management Function (SMF) 110, which is operatively coupled to a User Plane Function (UPF) 112. UPF 112 is operatively coupled to a Packet Data Network, e.g., Internet 114. Note that the thicker solid lines in this figure denote a user plane (UP) of the communication network, as compared to the thinner solid lines that denote a control plane (CP) of the communication network. It is to be appreciated that network 114 in FIG. 1 may additionally or alternatively represent other network infrastructures including, but not limited to, cloud computing infrastructure and/or Edge computing infrastructure. Further typical operations and functions of such network elements are not described here since they are not the focus of the illustrative embodiments and may be found in appropriate 3GPP 5G documentation. Note that functions shown in 106, 108, 110 and 112 are examples of network functions (NFs).

It is to be appreciated that this particular arrangement of system elements is an example only, and other types and arrangements of additional or alternative elements can be used to implement a communication system in other embodiments. For example, in other embodiments, the system 100 may comprise other elements/functions not expressly shown herein.

Accordingly, the FIG. 1 arrangement is just one example configuration of a wireless cellular system, and numerous alternative configurations of system elements may be used. For example, although only single elements/functions are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104.

Figure 2:
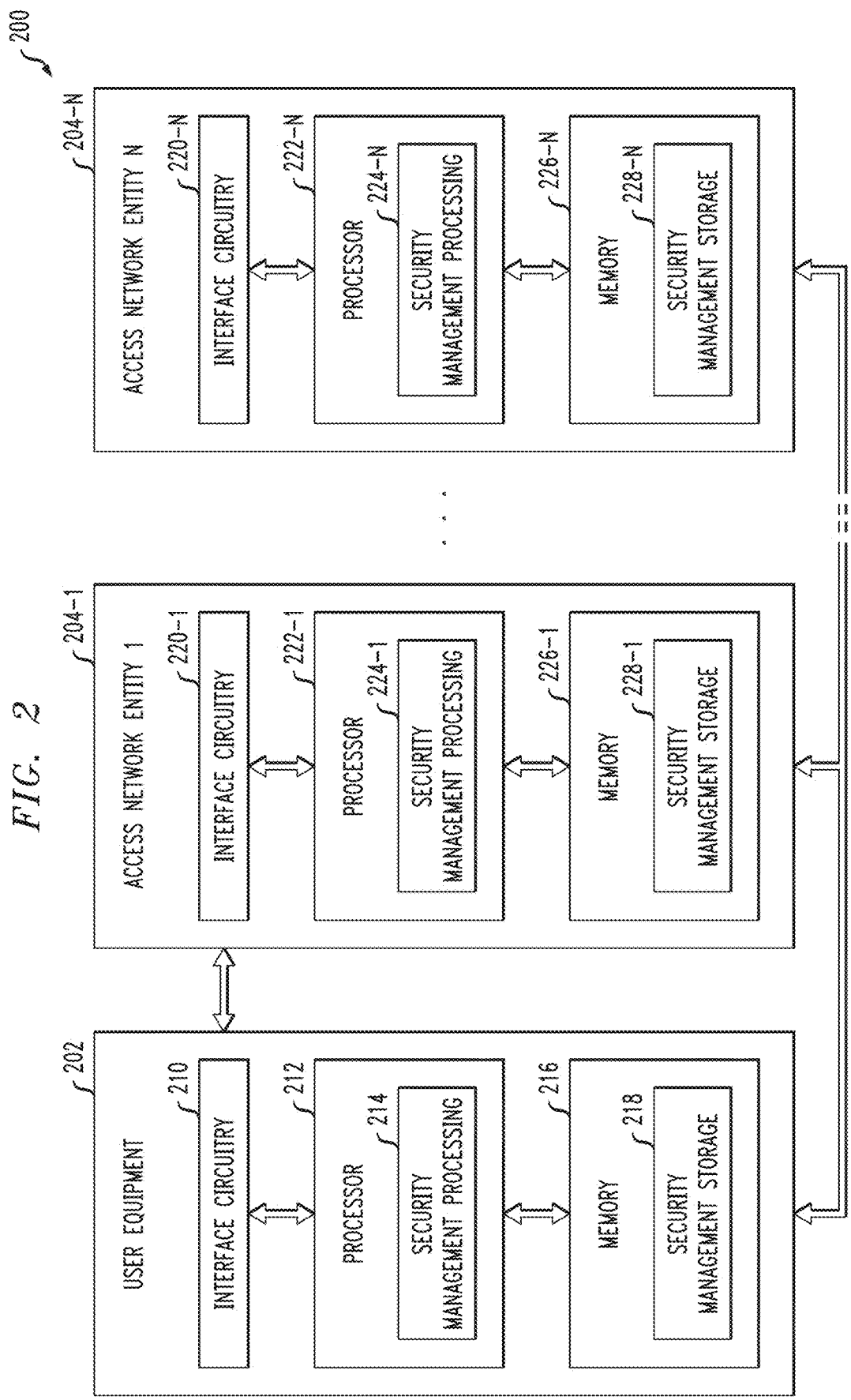
FIG. 2 illustrates user equipment and access network entities with which one or more illustrative embodiments may be implemented.

FIG. 2 is a block diagram illustrating computing architectures for various participants in methodologies according to illustrative embodiments. More particularly, system 200 is shown comprising user equipment (UE) 202 and a plurality of access network entities 204-1, . . . , 204-N, operatively coupled to one another. For example, in illustrative embodiments and with reference back to FIG. 1, UE 202 can represent UE 102, while access network entities 204-1, . . . , 204-N can represent respective access points 104. More particularly, access network entity 204-1 can be an anchor gNB and access network entities 204-2, . . . , 204-N can be available target gNBs. Further, in a disaggregated RAN architecture, one of access network entities 204-2, . . . , 204-N can represent a CU component of a gNB while another one of access network entities 204-2, . . . , 204-N can represent a DU component of the same gNB. It is to be appreciated that the UE 202 and access network entities 204-1, . . . , 204-N are configured to interact to provide security management and other techniques described herein.

The user equipment 202 comprises a processor 212 coupled to a memory 216 and interface circuitry 210. The processor 212 of the user equipment 202 includes a security management processing module 214 that may be implemented at least in part in the form of software executed by the processor. The processing module 214 performs security management described in conjunction with subsequent figures and otherwise herein. The memory 216 of the user equipment 202 includes a security management storage module 218 that stores data generated or otherwise used during security management operations.

Each of the access network entities (individually or collectively referred to herein as 204) comprises a processor 222 (222-1, . . . , 222-N) coupled to a memory 226 (226-1, . . . , 226-N) and interface circuitry 220 (220-1, . . . , 220-N). Each processor 222 of each access network entity 204 includes a security management processing module 224 (224-1, . . . , 224-N) that may be implemented at least in part in the form of software executed by the processor 222. The processing module 224 performs security management operations described in conjunction with subsequent figures and otherwise herein. Each memory 226 of each access network entity 204 includes a security management storage module 228 (228-1, . . . , 228-N) that stores data generated or otherwise used during security management operations.

The processors 212 and 222 may comprise, for example, microprocessors such as central processing units (CPUs), application-specific integrated circuits (ASICs), digital signal processors (DSPs) or other types of processing devices, as well as portions or combinations of such elements.

The memories 216 and 226 may be used to store one or more software programs that are executed by the respective processors 212 and 222 to implement at least a portion of the functionality described herein. For example, security management operations and other functionality as described in conjunction with subsequent figures and otherwise herein may be implemented in a straightforward manner using software code executed by processors 212 and 222.

A given one of the memories 216 and 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

Further, the memories 216 and 226 may more particularly comprise, for example, electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 illustratively comprise transceivers or other communication hardware or firmware that allows the associated system elements to communicate with one another in the manner described herein.

It is apparent from FIG. 2 that user equipment 202 and plurality of access network entities 204 are configured for communication with each other as security management participants via their respective interface circuitries 210 and 220. This communication involves each participant sending data to and/or receiving data from one or more of the other participants. The term "data" as used herein is intended to be construed broadly, so as to encompass any type of information that may be sent between participants including, but not limited to, identity data, keys, key indicators, security management messages, request/response messages and data, request/response messages, authentication request/response messages and data, metadata, control data, audio, video, multimedia, other messages and/or parameters, etc.

It is to be appreciated that the particular arrangement of components shown in FIG. 2 is an example only, and numerous alternative configurations may be used in other embodiments. For example, any given network element/function can be configured to incorporate additional or alternative components and to support other communication protocols.

Other system elements such as MMF 106, other functions 108, SMF 110, and UPF 112 may each be configured to include components such as a processor, memory and network interface. These elements need not be implemented on separate stand-alone processing platforms, but could instead, for example, represent different functional portions of a single common processing platform.

More generally, FIG. 2 can be considered to represent processing devices configured to provide respective security management functionalities and operatively coupled to one another in a communication system.

As mentioned above, the 3GPP TS 23.501 defines the 5G system architecture as service-based, e.g., Service-Based Architecture (SBA). It is realized herein that in deploying different NFs, there can be many situations where an NF may need to interact with an entity external to the SBA-based 5G core network (e.g., including the corresponding PLMN(s), e.g., HPLMN and VPLMN). Thus, the term "internal" as used herein illustratively refers to operations and/or communications within the SBA-based 5G core network (e.g., SBA-based interfaces) and the term "external" illustratively refers to operations and/or communications outside the SBA-based 5G core network (non-SBA interfaces).

Given the above general description of some features of a 5G network, problems with existing security approaches and solutions proposed in accordance with illustrative embodiments will now be described herein below.

In accordance with the RRC protocol layer for 5G NR, an UE can be in one of three RRC states, i.e., RRC_IDLE, RRC_CONNECTED and RRC_INACTIVE. After power up, the UE is in idle mode and in order to perform data transfer or to make/receive voice calls, the UE needs to establish connection with the network which is done via the RRC connection establishment procedure. Once RRC connection is established, the UE is in the RRC_CONNECTED state. If there is no activity to/from the UE for a specified amount of time, the network directs the UE to move to the RRC_IDLE state so as to reduce power consumption for the UE. Then, when the UE needs to perform some activity, it transitions to the connected mode which involves some RRC signaling overhead which, in turn, increases packet latency. It is understood that the UE has to, on occasion, send small amounts of data, which would each time lead to idle-connected-idle transitions. These transitions would result in increased network signaling overhead in addition to increased packet latency. Therefore, the RRC_INACTIVE state is defined to reduce network signaling as well as to reduce latency involved in transitioning to the RRC_CONNECTED state. Accordingly, a UE is in the RRC_CONNECTED state when an RRC connection has been established or in the RRC_INACTIVE state (if the UE is connected to the network) when RRC connection is temporarily suspended. Otherwise, when there is no RRC connection established, the UE is in the RRC_IDLE state.

Currently, such small and typically infrequent data transfers (i.e., referred to as a short data transmissions or SDTs) that are needed by a UE in the RRC_INACTIVE state require that an RRC connection resume request be made by the UE to switch the UE to the RRC_CONNECTED state. The small data can be transferred, and a subsequent suspension of the connection back to the RRC_INACTIVE state will typically occur immediately after the data transfer. However, this may happen for each and every data transmission, and still result in unnecessary UE power consumption and signaling overhead as well as increased packet latency. However, the 5G NR system has requirements to be efficient and flexible for low throughput short data bursts (see the above-referenced TS 22.891) and to support efficient signaling mechanisms (e.g., signaling is less than payload), and reducing the signaling overhead in general.

Therefore, in 3GPP Release 17 (Rel-17), there is an ongoing Work Item (WI) entitled "NR small data transmissions in INACTIVE state" (RP-201305) to address the inefficiencies explained above, i.e., signaling overhead and packet delay associated with state transition from RRC_I-

NACTIVE to RRC_CONNECTED to perform a SDT. The SDT functionality is important, since the motivation to introduce the RRC_INACTIVE state itself in 5G NR, as explained above, is to be able to transition UEs with small and infrequent data transmission to a state with minimum signaling overhead and minimum power consumption.

The current approved version of the objectives of this WI may be paraphrased as follows. For the RRC_INACTIVE state with Uplink (UL) SDTs for RACH-based schemes (i.e. 2-step and 4-step RACH), there should be: a general procedure to enable User Plane (UP) data transmission for small data packets from the INACTIVE state; enablement of flexible payload sizes larger than the Rel-16 CCCH message size that is possible currently for the INACTIVE state to support UP data transmission in UL (actual payload size can be up to network configuration), and support context fetch and data forwarding (with and without anchor relocation) in the INACTIVE state for RACH-based solutions. For the RRC_INACTIVE state with a transmission of UL data on pre-configured PUSCH resources (i.e., reusing the configured grant type 1) when timing advance (TA) is valid, there should be a general procedure for SDT over configured grant type 1 resources from the INACTIVE state; and support for configuration of the configured grant type1 resources for SDT in UL for the INACTIVE state.

Figure 3:
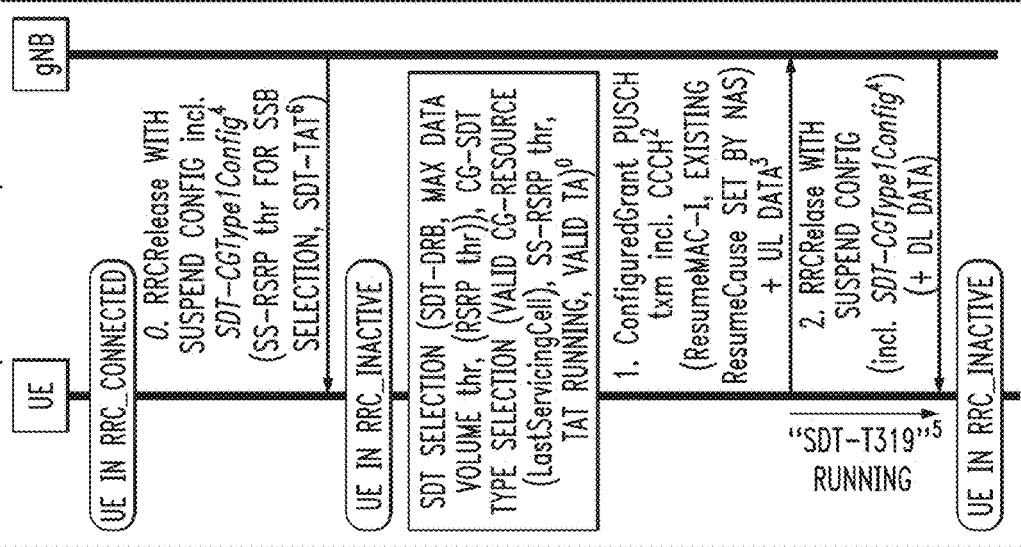
FIG. 3A-3C respectively illustrate types of small data transmission for a single-shot case with which one or more illustrative embodiments may be implemented.

The three SDT types mentioned above within the scope of the 3GPP Rel-17 WI are respectively illustrated in FIGS. 3A-3C for the single-shot SDT case, i.e., an SDT procedure that includes only one Uplink (UL) data transfer and in addition only one Downlink (DL) data transfer (optionally). More particularly, FIG. 3A summarizes a process 300 for a 4-step RACH based SDT type, FIG. 3B summarizes a process 310 for a 2-step RACH based SDT type, and FIG. 3C summarizes a process 320 for a configured grant (CG) based SDT type.

Furthermore, multi-shot SDT, i.e. an SDT procedure that includes multiple subsequent Uplink/Downlink (UL/DL) SDT transmissions without transitioning to the RRC_CONNECTED state, have been proposed. More particularly, when the UE is in the RRC_INACTIVE state, the proposed multi-shot scheme would send multiple UL and DL packets as part of the same SDT mechanism and without transitioning to the RRC_CONNECTED state on the dedicated grant.

As per the WI description (WID) in RP-201305, both SDT solutions with and without anchor relocation are in the scope for random access SDT (RA-SDT), and will be defined in Rel-17. It is to be noted that the decision on whether to perform anchor relocation or not is up to the network and is transparent to the UE. A working assumption is that the decision is up to the anchor gNB based on assistance information received from the target gNB. The content of such assistance information may include, but is not limited to, an indication of whether the UE has further data to transmit in addition to the payload(s) included in the initial UL SDT transmission.

Accordingly, the two solutions, triggered by the initial UL SDT transmission from the UE, can be summarized as follows:

(i) In SDT with anchor relocation: the target gNB initiates both the UE Access Stratum (AS) context fetch from the anchor gNB (i.e., last serving gNB) and the path switch procedure. After both procedures are complete, the PDCP processing of the UL data received from the UE can take place at the target gNB and the UL data can be forwarded to the UPF. This is similar to the legacy procedure of RRC connection resume described below.

(ii) In SDT without anchor relocation: the target gNB initiates the UE AS context fetch from the anchor gNB (i.e., last serving gNB) but the anchor gNB responds with, e.g., a "Retrieve Context Failure." That is, the anchor gNB does not provide the UE AS context and keeps storing it. In addition, no path switch takes place, which is beneficial to avoid the heavy associated signaling. This is similar to the legacy procedure of RNA described below.

It is to be appreciated that the signaling of SDT without anchor relocation is not optimized in Rel-17. Particularly, the use of a UE-specific Radio Link Control (RLC) context has been proposed for SDT in Rel-17. This implies the need for backhaul signaling to fetch the RLC configuration of the UE from the anchor gNB (CU-CP in disaggregated RAN architectures), which is necessary to process, at the target gNB/DU, the RLC PDU received from the UE. It is to be noted that such RLC configuration retrieval is needed even though the UE AS context remains at the anchor gNB (CU-CP), i.e., no context nor anchor relocation takes place in SDT without relocation, as explained above. This results in increased backhaul signaling as illustrated by FIG. 4.

Figure 4:
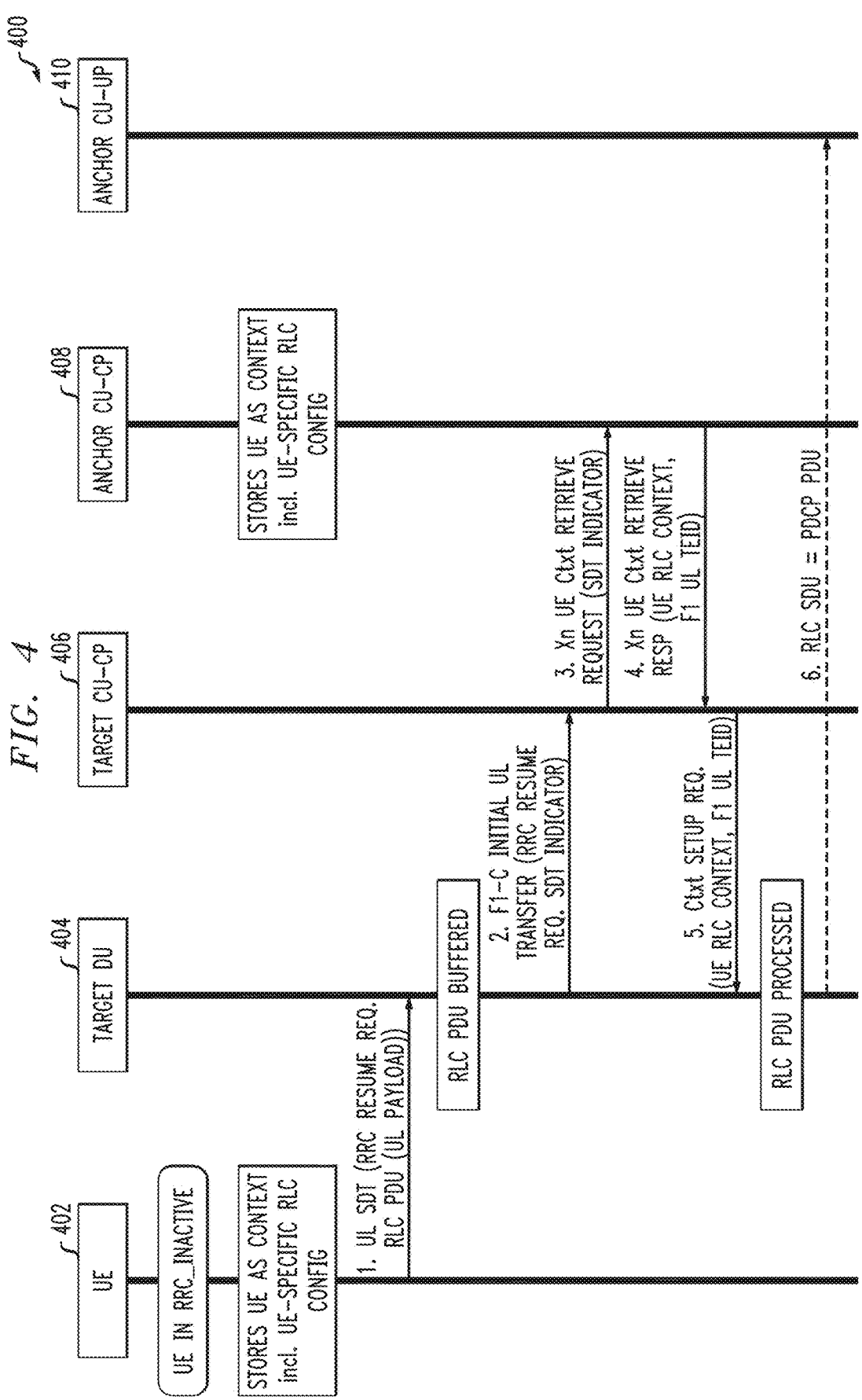
FIG. 4 illustrates small data transmission according to a signaling protocol without anchor relocation with which one or more illustrative embodiments may be implemented.

More particularly, FIG. 4 illustrates a message flow 400 according to an SDT signaling protocol without anchor relocation involving UE 402, target DU 404 (of target gNB), target CU-CP 406 (corresponding to target DU 404), anchor CU-CP 408 (of anchor gNB) and anchor CU-UP 410 (corresponding to anchor CU-CP 408). As shown, UE 402 is in the RRC_INACTIVE state and stores its UE AS context including the UE-specific RLC configuration. Likewise, it is assumed that anchor CU-CP 408 stores the same UE AS context including the UE-specific RLC configuration.

In step 1, UE 402 sends, as part of a UL SDT message, an RRC Resume Request and UL payload (RLC PDU) to target DU 404. Target DU 404 buffers the RLC PDU.

In step 2, target DU 404 sends an F1-C Initial UL Transfer including the RRC Resume Request and an SDT Indicator to its corresponding CU-CP, i.e., target CU-CP 406. The F1 interface connects a gNB CU to a gNB DU. The control plane of the F1 interface (F1-C) allows signaling between the CU and DU, while the user plane of the F1 interface (F1-U) allows the transfer of application data.

In step 3, target CU-CP 406 sends an Xn UE Ctxt Retrieve Request with the SDT Indicator to anchor CU-CP 408. The Xn interface is defined between two NG-RAN nodes.

In step 4, anchor CU-CP 408 replies to target CU-CP 406 with an Xn UE Ctxt Retrieve Response including the UE RLC context and an F1 UL TEID. TEID refers to a tunnel endpoint identifier. GTP-U tunnels are used to carry encapsulated PDUs and signaling messages between a given pair of GTP-U tunnel endpoints. TEID indicates the tunnel to which a particular PDU belongs.

In step 5, target CU-CP 406 provides the UE RLC context and the F1 UL TEID to target DU 404 in a Ctxt Setup Request.

In step 6, target DU 404 processes the RLC PDU it had previously buffered and sends an RLC SDU (equivalent to a PDCP PDU) to anchor CU-UP 410. Note that SDU refers to a Service Data Unit which is a packet received by a protocol layer while the packet output from the protocol layer is referred to as a PDU.

Figure 5:
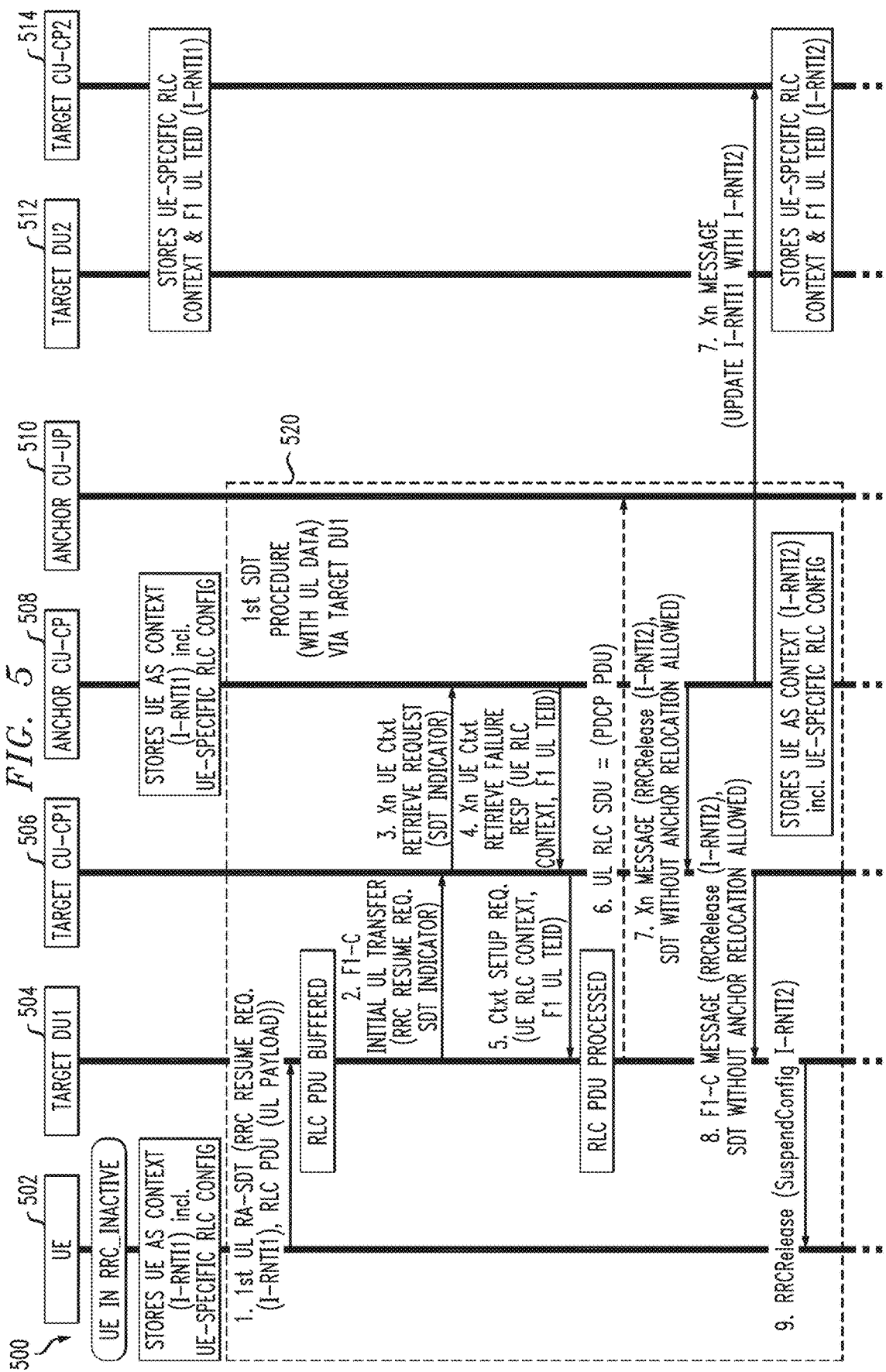
FIG. 5 illustrates small data transmission according to a signaling protocol without anchor relocation which avoids context fetch with which one or more illustrative embodiments may be implemented.
Figure 5:
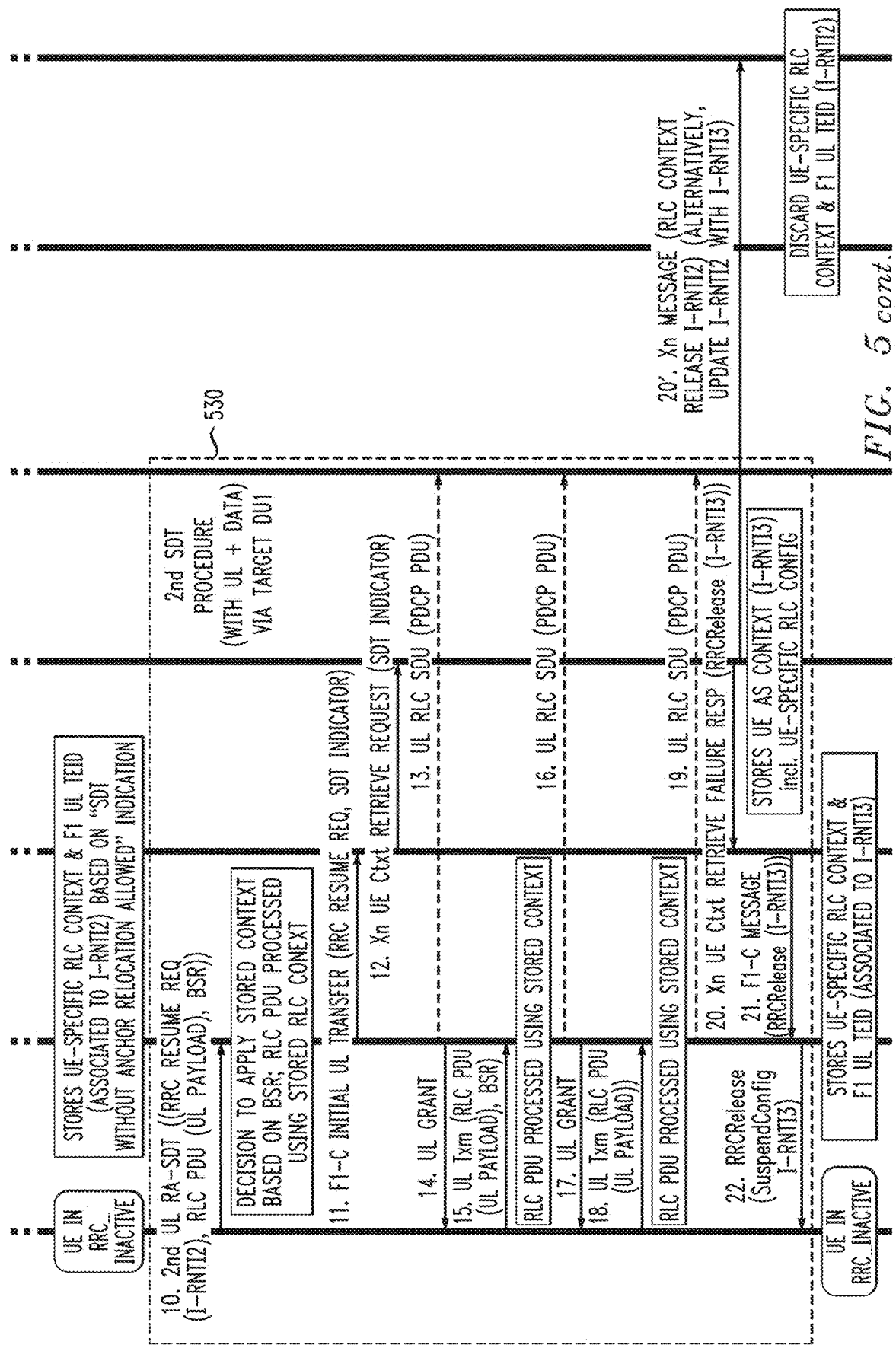

To avoid the context fetching in the SDT scenario illustrated in FIG. 4, enhancements have been proposed to make the signaling of an SDT without anchor relocation leaner (e.g., less signaling overhead) by avoiding the need for RLC context fetch by a target gNB at least for a "returning UE". A "returning UE" is defined as a UE that initiates multiple SDT procedures in the same target gNB. (assuming that each SDT procedure is without anchor relocation to save path switch signaling between RAN and AMF). FIG. 5 illustrates the signaling for such proposed enhancements.

More particularly, FIG. 5 illustrates a message flow 500 according to a SDT signaling without anchor relocation involving UE 502, target DU1 504 (DU of one target gNB), target CU-CP1 506 (corresponding to target DU1 504), anchor CU-CP 508 (of anchor gNB), anchor CU-UP 510 (corresponding to anchor CU-CP 508), target DU2 512 (DU of another available target gNB), target CU-CP2 514 (corresponding to target DU2 512).

Further, assume that UE 502 is involved initially in a first SDT procedure 520 with target DU 1 504 for only UL data (small data transferred from UE 502 to the communication system), and then in a second SDT procedure 530 again with target DU1 504 (in which case, UE 502 is considered a "returning UE") for not only UL data but also DL data (small data transferred from the communication system to UE 502).

UE 502 is in the RRC_INACTIVE state and stores its UE AS context including the UE-specific RLC configuration. Likewise, it is assumed that anchor CU-CP1 508 stores the same UE AS context including the UE-specific RLC configuration. Also, assuming that target DU2 512 and target CU-CP2 514 were involved in an SDT procedure previous to SDT procedure 520, DU2 512 and target CU-CP2 514 have stored UE-specific RLC configuration and F1 UL TEID with a Radio Network Temporary Identifier (I-RNTI) referenced as I-RNTI1, as shown. An RNTI is an identifier specified by the radio access network that uniquely identifies a specific RRC connection for a specific UE, in this case, UE 502. I-RNTI is used to identify the suspended UE context of a UE in the RRC_INACTIVE state. Thus, in the context of successive SDT inactive-connected-inactive cycles, the I-RNTI is refreshed and a newly generated value is issued, i.e., I-RNTI1, I-RNTI-2, . . . , and so on.

For SDT procedure 520, it is understood that steps 1-6 are the same as shown in FIG. 4 (but with reference to I-RNTI1). Note that steps 7, 8 and 9, which constitute the release procedure to place UE 502 back into the RRC_INACTIVE state are performed as shown in message flow 500 of FIG. 5, but also are performed in message flow 400 of FIG. 4 although not expressly shown.

So, as shown in FIG. 5, step 7 sends an Xn message from anchor CU-CP 508 to target CU-CP1 506 with an RRC Release referenced by I-RNTI2 and an "SDT without anchor relocation allowed" indication. Note that the I-RNTI is advanced after completion of the current SDT procedure, i.e., SDT procedure 520, as thus is now referenced as I-RNTI2. Note also that in step 7', anchor CU-CP 508 sends an Xn message to target DU2 512 and target CU-CP2 514 to update I-RNTI1 to I-RNTI2.

In step 8, target CU-CP1 506 sends an F1-C message to target DU1 504 with an RRC Release referenced by I-RNTI2 and an "SDT without anchor relocation allowed" indication.

In step 9, target DU1 504 sends an RRC Release with a Suspend ConFIG. I-RNTI2 instruction to UE 502. Anchor CU-CP 508 stores the UE AS context for I-RNTI2 including the UE-specific RLC configuration.

SDT procedure 520 ends with UE 502 back in the RRC_INACTIVE state and with target DU1 504 and target CU-CP1 506 storing the UE-specific RLC context and F1 UL TEID associated with I-RNTI2 based on the "SDT without anchor relocation allowed" indication.

Turning now to SDT procedure 530, wherein UE 502 is considered a "returning UE" with respect to target DU1 504 and target CU-CP1 506, steps 10 through 22 execute as follows.

In step 10, UE 502 sends, as part of a second UL SDT message, an RRC Resume Request referencing I-RNTI2, UL payload (RLC PDU) and a Buffer Status Report (BSR) to target DU1 504. Target DU1 504 executes a decision to apply the stored RLC context for UE 504 based on the BSR, and processes the RLC PDU using the stored RLC context.

In step 11, target DU1 504 sends an F1-C Initial UL Transfer including the RRC Resume Request and an SDT Indicator to its corresponding CU-CP, i.e., target CU-CP1 506.

In step 12, target CU-CP1 506 sends an Xn UE Ctxt Retrieve Request with the SDT Indicator to anchor CU-CP 508.

In step 13, In step 6, target DU1 504 sends an RLC SDU (equivalent to a PDCP PDU) to anchor CU-UP 510.

In step 14, a UL Grant is sent from target DU1 504 to UE 502. Subsequent data can then be sent as follows.

In step 15, a subsequent RLC PDU is sent from UE 502 to target DU1 504, which processes the RLC PDU and forwards the resulting SDU to anchor CU-UP 510 in step 16, followed by a UL Grant being sent from target DU1 504 to UE 502 in step 17.

Similarly, in step 18, a subsequent RLC PDU is sent from UE 502 to target DU1 504, which processes the RLC PDU and forwards the resulting SDU to anchor CU-UP 510 in step 19.

Assume now in step 20, anchor CU-CP 508 performs a confirmation and, based on the result of the confirmation process, sends an Xn UE Ctxt Retrieve Failure Response message to target CU-CP1 506 with an RRC Release referenced by I-RNTI3. Note again that the I-RNTI is advanced after completion of the current SDT procedure, i.e., SDT procedure 530, as thus is now referenced as I-RNTI3. Note also that in step 20', anchor CU-CP 508 sends an Xn message to target DU2 512 and target CU-CP2 514 with an RLC Context Release referencing I-RNTI2 (or alternatively to update I-RNTI2 to I-RNTI3). If the message is an RLC Context Release, target CU-CP2 514 discards the UE-specific RLC context and the F1 UL TEID referencing I-RNTI2.

In step 21, target CU-CP1 506 sends an F1-C message to target DU1 504 with an RRC Release referenced by I-RNTI3.

In step 22, target DU1 504 sends an RRC Release with a Suspend ConFIG. I-RNTI3 instruction to UE 502. Anchor CU-CP 508 stores the UE AS context for I-RNTI3 including the UE-specific RLC configuration.

SDT procedure 530 ends with UE 502 back in the RRC_INACTIVE state and with target DU1 504 and target CU-CP1 506 storing the UE-specific RLC context and F1 UL TEID associated with I-RNTI3.

Accordingly, for UE 502 ("returning UE") in FIG. 5, when performing repeated SDT transactions in the same target DU/target gNB, the stored UE-specific context certainly provides power, signaling and latency gains. But it is equally important to ensure there is no security breach by a malicious UE hacking into a SDT transaction of an authentic UE, when initiating the data flow in step 13 of FIG. 5 before the confirmation in step 20 that UE 502 is verified.

In fact, the network performs security verification of UEs accessing the network from the RRC_INACTIVE state at the anchor gNB based on a CP-MAC-Integrity token sent by the UE in the RRC Resume Request message (i.e., Resume MAC-I). Currently, UE validation cannot be evaluated at the target CP, thus Xn network signaling is required despite having had a UE context stored at the target gNB.

As per TS 33.501, the ResumeMAC-I/shortResume-MAC-I, used for UE verification of UEs in RRC_INACTIVE state, is a 16-bit message authentication token that the UE calculates using the integrity algorithm (NIA or EIA) in the stored AS security context, which was negotiated between the UE and the source gNB/ng-eNB, and the current $K_{RRCint}$ with certain known inputs: (i) KEY: set to current $K_{RRCint}$; (ii) BEARER: all bits set to 1; (iii) DIRECTION: bit set to 1; (iv) COUNT: all bits set to 1; (v) MESSAGE: set to Var Resume MAC-Input/Var Short Inactive MAC-Input as defined in the above-referenced TS 38.331 for gNB and in the above-referenced TS 36.331 for ng-eNB with following inputs: target cell identifier (target cell-ID), source C-RNTI (C-RNTI is a Cell RNTI used for identifying RRC connection and scheduling), source physical cell identifier (PCI).

Figure 6:
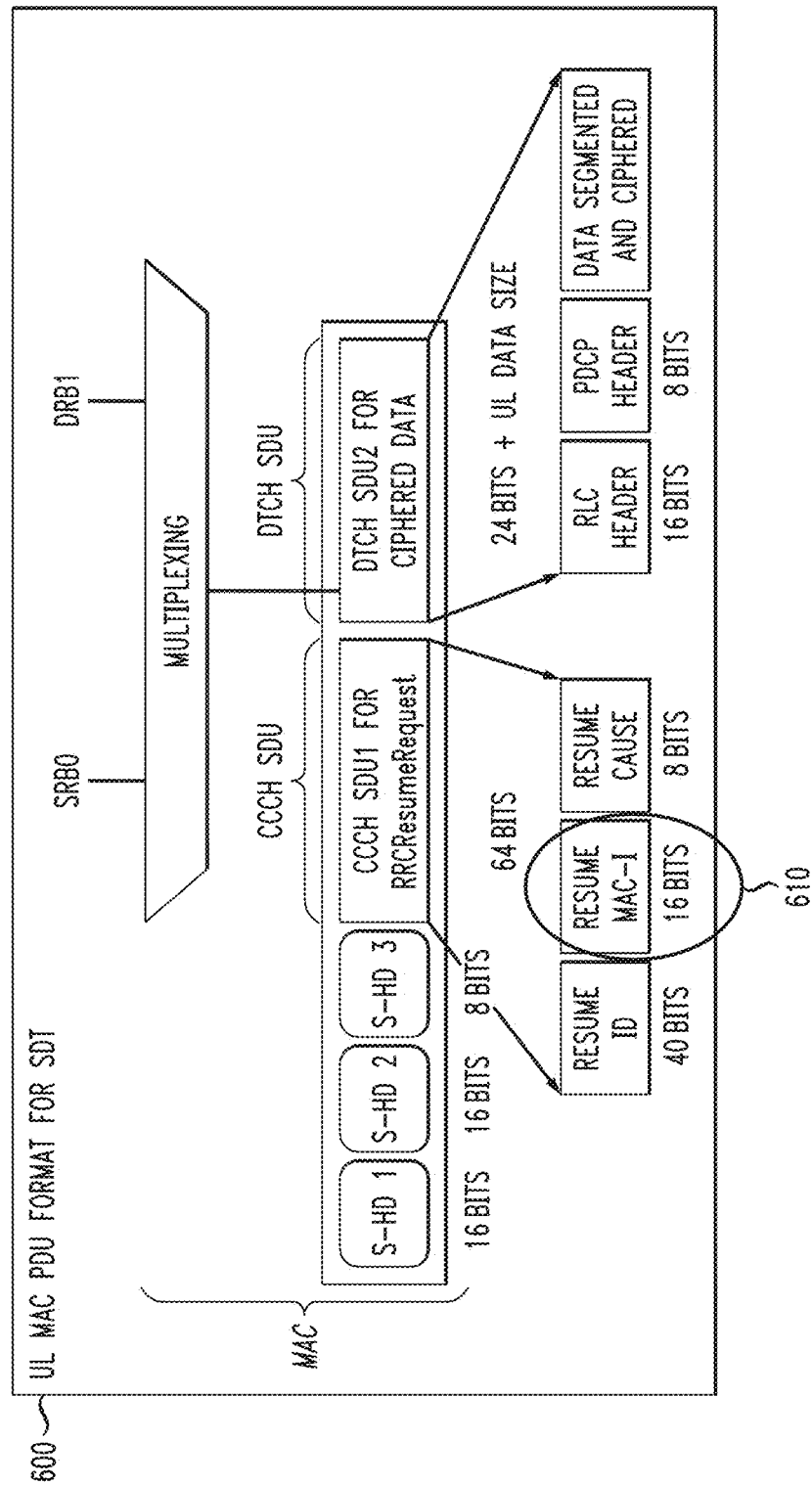
FIG. 6 illustrates an example of a protocol data unit format for small data transmission according to an illustrative embodiment.

FIG. 6 illustrates an SDT UL PDU 600 with the above-mentioned 16-bit message authentication token 610 calculated by the UE.

However, in accordance with the signaling protocol of message flow 500 in FIG. 5, the verification of UE 502 cannot be performed until step 20, before which multiple SDT PDUs may have been sent to anchor CU-UP 510 from target DU1 504, e.g., in good faith of UE 502 not being a malicious UE.

An alternative would be to enable integrity protection for user plane data radio bearers (UP DRBs), which is not only an expensive operation, but also needs extra processing at the UE/network and is power consuming for the UE as well.

Thus, in current procedures defined with respect to I-RNTI as per TS 33.501/TS 38.300, the UE mobility could be tracked if the I-RNTI over the air is intercepted. This is because the RRC Resume Request message sent by the UE to the network to resume its connection, including the I-RNTI, is sent on CCCH that is not secured. To avoid UE trackability, TS 33.501 mandates that the UE ID part of the I-RNTI assigned by the network be different in consecutive suspends of the same UE.

Similarly for SDT, the UE has to include its I-RNTI in the RRC Resume Request message (or a like RRC message) in the initial UL SDT transmission. To avoid traceability, at the end of each SDT procedure (as illustrated in message flow 500 of FIG. 5), the anchor CU-CP has to send an RRC Release message to the UE including a new I-RNTI.

Illustrative embodiments overcome the above-mentioned challenges in message flow 500 of FIG. 5, as well as other challenges. As will be explained further herein, illustrative embodiments perform UE verification at a target gNB upon SDT/RRC connection resume initiated, for example, by a "returning UE" in the target gNB. More particularly, techniques are provided for a target gNB in the RAN-based Notification Area (RNA) of the UE to perform verification of a UE authentication token, e.g., Resume MAC-I/Short-Resume MAC-I, based on a UE-specific security key that is specific to each target gNB of the RNA (e.g., d-KRRCint).

For example, in one illustrative embodiment, the above-mentioned new UE-specific security key is generated by the anchor CU-CP and sent from the anchor gNB to a potential target gNB either during a previous SDT/RRC connection resume procedure of the UE in this target gNB ("returning UE" scenario) or proactively ("first-time UE" SDT scenario) before SDT is performed in a target gNB.

The anchor gNB also instructs the UE (i.e., sends SDT specific parameters) to enable the UE to construct the same target gNB-specific key (d-KRRCint from KRRCint from KgNB) whenever resuming at a particular target gNB within the RNA.

For example, the anchor gNB can instruct the UE (i.e., sends SDT specific parameters) via the RRC Release message with suspend Configuration as in the legacy procedure. This can be done either the first time the UE moves to the RRC_INACTIVE state or after the UE initiates an SDT/resume procedure (e.g., RNA update) without anchor relocation via the potential target gNB.

When enabled, the anchor gNB also configures the UE (step 9 of FIG. 5) as to whether it should use the legacy key and the token computation process to calculate the MAC-I or whether it should use the derived key and new token calculation according to illustrative embodiments. This configuration can be per potential target gNB, i.e., the configuration message includes a list of target gNBs for which the UE should use the new derived key for MAC-I (token) calculation according to illustrative embodiments (assuming then that the UE uses the legacy key and token generation when resuming at a target gNB which is not part of this list).

Thus, for example, in the "returning UE" scenario in a target gNB scenario (derived key sent during previous SDT procedure), the following steps are performed:
(1) Verification of the Resume MAC-I is performed by the anchor gNB-CU-CP based on the legacy key ($K_{RRCint}$) during the first SDT procedure involving a new target gNB which has to perform Xn-based UE context retrieval procedure. More particularly:
  (i) The anchor CU-CP derives a new security key (d-KRRCint) specific to the new target gNB and sends it to this new target gNB-CU-CP in the Xn-based message: UE Context Retrieval Failure or the Xn-based message: UE Context Retrieval Response message, together with allowance to use it.
  (ii) A given target gNB uses this derived key (retrieved at the first SDT transaction) for all subsequent SDT procedures that would be performed therewith if allowed.
  (iii) Once the UE moves out of the RNA, the anchor changes and again a fresh set of derived keys is shared by the anchor gNB.
(2) Subsequently, if a "returning UE" performs an SDT procedure in the same target gNB, the Resume MAC-I verification is performed at this target gNB-CU-CP based on the derived key stored in the UE context.
(3) Alternatively, a new key may be derived at each subsequent SDT procedure by the target gNB-CU-CP based on the information provided by the anchor gNB-CU-CP (target gNB deriving d-KRRCint). The authentication token, that the UE uses when resuming, is calculated using parameters and information known by the target gNB-CU-CP, such that a target gNB-CU-CP can verify it. These parameters include at least one of a target cell identifier (target cell-ID), a source C-RNTI, and a source physical cell-ID (PCI).

Still further, in the "first-time UE" scenario in a target gNB scenario (pro-active sending of the derived keys in one or more target gNBs), the anchor gNB generates the derived keys for each target gNB of the RNA of the UE and distributes them in advance.

FIGS. 7A-7C collectively illustrate proactive distribution of derived security keys by an anchor base gNB. FIG. 7A illustrates an example of an RNA 700 for a given UE. FIG. 7B illustrates the set of keys 710 generated by the anchor gNB for the set of target gNBs in RNA 700, i.e., target gNBT through target gNB6. FIG. 7C illustrates the information 720 that the anchor gNB sends to the given UE. As shown, by way of example, information 720 comprises $UE_{I-RNTI}$ and one or more security parameters for key generation (one of the set of keys 710 generated by anchor gNB) for any target gNB in RNA 700. It is to be appreciated that the key generation and distribution to target gNBs could use a process adapted from a handover (HO) preparation scenario, but using parameters specific to SDT. The keys are not valid for any other purpose than SDT. The anchor gNB also instructs (i.e., sends parameters) to the UE, so that the UE knows whether and how to construct a key necessary for the Resume MAC-I generation at any target gNB within the RNA.

Still further, in another illustrative embodiment, in a disaggregated architecture, the per target gNB's derived key is sent from the target CU-CP to all potential target DUs (inside the same RNA). Whenever the UE resumes via the target gNB using the new derived key and process, the verification of the MAC-I (token) is done at the target DU instead of being done at target CU-CP.

More particularly, illustrative embodiments provide the following differences to the current calculation of the UE authentication token, specifically for d-KRRCint generation and provisioning:
 (i) The anchor gNB sends, to the UE, the parameters necessary to generate the derived key for SDT which is UE-specific, and valid in a specific target gNB. The parameters may, for example, comprise a target gNB ID, or a target cell ID if known to the anchor gNB in advance.
 (ii) The anchor gNB also configures the UE via the target gNB as to whether the UE is expected to use the legacy key or the new derived key.
 (iii) The UE is able to use the specified key when the UE selects the target gNB, to send the SDT.
 (iv) The anchor gNB itself computes and sends, to the target gNB, the derived key d-KRRCint, specific to the target gNB for the SDT. The target gNB stores the derived key, along with the received UE ID, i.e., I-RNTI, and other security parameters such as algorithms, etc.

Regarding derived key generation, the UE generates the per target gNB derived key using the SDT specific parameters sent by the anchor gNB.

Regarding token (MAC-I) generation, the UE applies the derived key for the specific target gNB (new d-KRRCint) with certain inputs to generate the UE authentication token similar to the legacy procedure with some adaptations:
 (i) KEY: is newly set to d-KRRCint computed for the selected target gNB (using parameters provided by the last serving/anchor gNB and stored in the UE AS context);
 (ii) BEARER: all bits set to 1;
 (iii) DIRECTION: bit set to 1;
 (iv) COUNT: all bits set to 1;
 (v) MESSAGE: set to Var Resume MAC-Input/Var Short Inactive MAC-Input as defined in TS 38.331 for gNB and in TS 36.331 for ng-eNB with inputs, examples of which are given as follows: (i) target cell-ID, (known at target gNB); (ii) source C-RNTI (last serving C-RNTI shared by anchor CU-CP to the target CU-CP either in the first Xn: UE Context Retrieval procedure); (iii) source PCI (last serving PCI shared by anchor CU-CP to the target CU-CP either in the first Xn: UE Context Retrieval procedure); and I-RNTI or any parameter sent to UE when releasing the SDT procedure (e.g., NCC). This ensures that the token is changed even in the case of consecutive resumptions via the same cell in the same target gNB.

Figure 8:
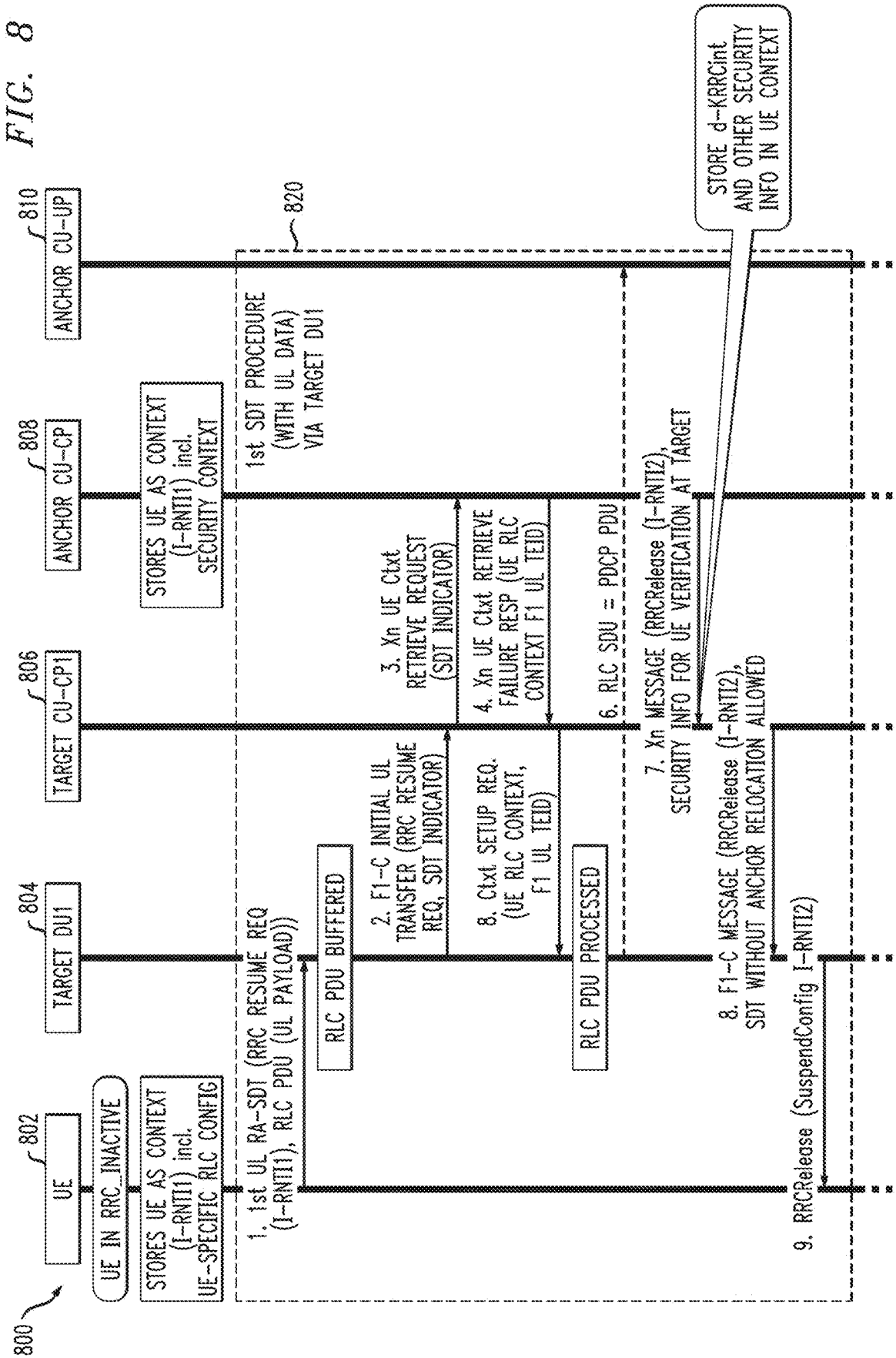
FIG. 8 illustrates a small data transmission with a signaling protocol according to an illustrative embodiment.
Figure 8:
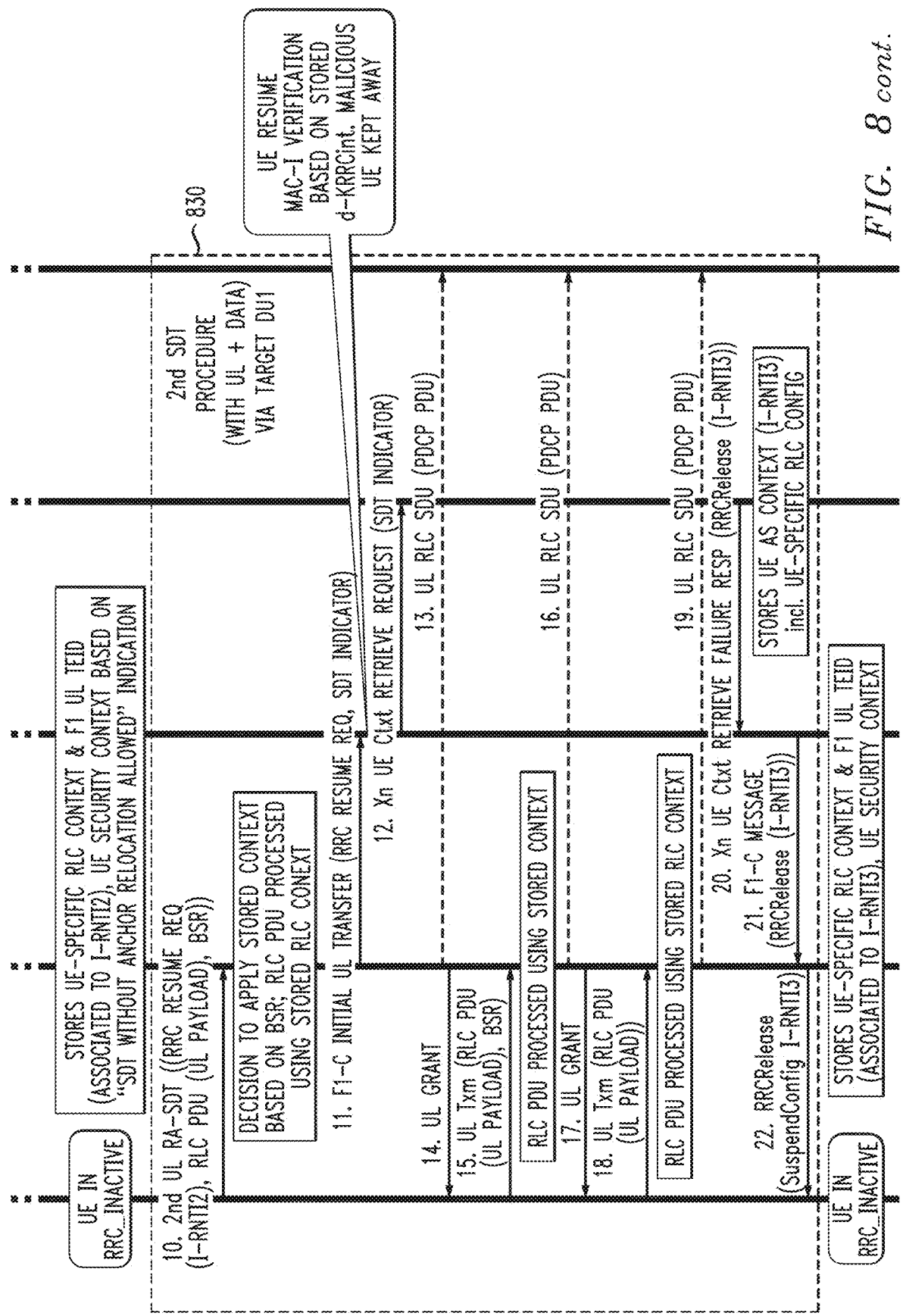

These features and advantages are highlighted in the context of FIG. 8. More particularly, FIG. 8 illustrates a message flow 800 for the improved signaling procedure for the scenario of the "returning UE" according to an illustrative embodiment. Message flow 800 according to an improved SDT signaling protocol without anchor relocation involves UE 802, target DU1 804, target CU-CP1 806 (corresponding to target DU1 804), anchor CU-CP 808 (of anchor gNB) and anchor CU-UP 810 (corresponding to anchor CU-CP 808). Not shown, for the sake of simplicity, are any additional target DUs or CU-CPs (e.g., target DU2, target CU-CP2, etc.). It is to be appreciated that steps 1 through 22 of message flow 800 in FIG. 8 are the same as steps 1 through 22 of message 500 in FIG. 5 (wherein SDT procedure 820 corresponds to SDT procedure 520, and SDT procedure 830 corresponds to SDT procedure 530), as described in detail above, with important exceptions to be noted below.

For example, with reference to step 7 in message flow 800, anchor CU-CP 808 includes the above-mentioned security information in the Xn-based message for use by target CU-CP1 806 to perform UE verification. Target CU-CP1 806 stores this security information as part of the security context for UE 802.

Then, advantageously, prior to target DU1 804 sending RLC SDU to anchor CU-UP 810 in step 13, target CU-CP1 806 performs UE Resume MAC-I verification based on the stored d-KRRCint to avoid the case where a malicious UE pretends to be the returning UE 802. That is, verification of a malicious UE would fail because, inter alia, the malicious UE would not be able to generate the new derived security key that the legitimate UE 802 would be able to generate.

Also, illustrative embodiments enable immediate identification of malicious UEs in the RRC_INACTIVE state initiating SDT or RRC connection resume procedures, i.e., identify them before consuming Xn signaling. Further, illustrative embodiments complement message flow 500 of FIG. 5 by enabling performance of UE verification at the target gNB before starting the UP data flow to the anchor CU-UP. Specifically, when applying illustrative embodiments, the UE verification can be performed at the target CU-CP immediately after step 11 of message flow 500. In an alternative illustrative embodiment, the UE verification can be performed at the target DU even before the target DU starts sending UP data flow.

FIGS. 9A through 9C detail steps performed by each of the SDT signaling protocol participants according to illustrative embodiments. More particularly, FIG. 9A illustrates a methodology 900 from the perspective of a UE (e.g., UE 802), FIG. 9B illustrates a methodology 920 from the perspective of an anchor gNB (e.g., anchor CU-CP 808 and anchor CU-UP 810), and FIG. 9C illustrates a methodology 940 from the perspective of a target gNB (e.g., target DU1 804 and target CU-CP1 806).

Methodology 900 of FIG. 9A executes from a user equipment perspective as follows.

Step 902 receives, at user equipment from a first access network entity in a communication network, identities of one or more second access network entities in the communication network.

Step 904 receives, at the user equipment from the first access network entity, one or more parameters specific to the received identities of the one or more second access network entities for generating a security key for use in resuming transmission of payload data to the first access network entity via one of the one or more second access network entities while the apparatus is connected to the communication network in an inactive state.

Step 906 generates, at the user equipment for a selected one of the one or more second access network entities, the security key for use in resuming transmission of the payload data to the first access network entity via the selected one of the one or more second access network entities.

Step 908 generates, at the user equipment, an authentication token based at least in part on: (i) the generated key for the selected one of the one or more second access network entities; and (ii) an identity of the received identities corresponding to the selected one of the one or more second access network entities.

Step 910 provides, from the user equipment to the selected one of the one or more second access network entities, the payload data for transmission to the first access network entity and the generated authentication token to enable authentication of the apparatus by the selected one of the one or more second network entities.

Methodology 920 of FIG. 9B executes from an anchor gNB perspective (first access network entity) as follows.

Step 922 generates, at a first access network entity of a communication network for user equipment in the communication network, one or more security keys corresponding to one or more second access network entities for use in resuming transmission of payload data to a first access network entity in the communication network, each of the one or more security keys being associated with user equipment in the communication network and a selected one of the one or more second access network entities in the communication network and being utilizable for resuming transmission of the payload data to the first access network entity in the communication network via the selected one of the one or more second access network entities while the user equipment is connected to the communication network in an inactive state.

Step 924 provides, to the user equipment, identities of the one or more second access network entities and one or more parameters for deriving the one of the one or more security keys associated with each of the one or more second access network entities.

Step 926 provides, to at least one of the one or more second access network entities, the generated security key for said at least one of the one or more second access network entities and an identity of the user equipment associated with the generated security key.

Methodology 940 of FIG. 9C executes from a target gNB perspective (selected one of the one or more second access network entities) as follows.

Step 942 receives, from a first access network entity in a communication network at a second access network entity in the communication network, a user equipment identity and a security key generated for the user equipment for use in resuming transmission of payload data towards the first access network entity.

Step 944 receives, from the user equipment connected to the communication network in an inactive state, an authentication token and the payload data for transmission to the first access network entity.

Step 946 verifies the authentication token received from the user equipment utilizing the received security key.

Step 948 provides, to the first access network entity, the payload data responsive to successful verification of the authentication token.

The particular processing operations and other system functionality described in conjunction with the diagrams described herein are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the various embodiments described herein are presented by way of illustrative example only and should not be construed as limiting the scope of the claims. For example, alternative embodiments can utilize different communication system configurations, user equipment configurations, base station configurations, provisioning and usage processes, messaging protocols and message formats than those described above in the context of the illustrative embodiments. These and numerous other alternative embodiments within the scope of the appended claims will be readily apparent to those skilled in the art.

What is claimed is:

1. An apparatus comprising:
   at least one processor;
   at least one memory including computer program code;
   the at least one memory and the computer program code being configured to, with the at least one processor, cause the apparatus at least to:
   receive, from a first access network entity in a communication network, a configuration message comprising (i) one or more identities, each of the one or more identities being associated with one of one or more second access network entities in the communication network, (ii) one or more parameters for deriving one or more security keys associated with each of the one or more second access network entities, and (iii) instructions for using at least one of the one or more security keys when generating an authentication token that is provided to a selected one of the one or more second access network entities to enable authentication of user equipment by the selected one of the one or more second access network entities prior to resuming transmission of payload data to the first access network entity via the selected one of the one or more second access network entities while the apparatus is connected to the communication network in an inactive state;
   generate, for the selected one of the one or more second access network entities, the at least one security key for use in resuming transmission of the payload data to the first access network entity via the selected one of the one or more second access network entities;
   generate the authentication token based at least in part on: (i) the generated at least one security key for the selected one of the one or more second access network entities; and (ii) an identity of the received one or more identities corresponding to the selected one of the one or more second access network entities; and
   provide, to the selected one of the one or more second access network entities, the payload data for transmission to the first access network entity and the generated authentication token to enable authentication of the apparatus by the selected one of the one or more second access network entities.

2. The apparatus of claim 1, wherein the first access network entity comprises an anchor base station in the communication network, and the selected one of the one or more second access network entities comprises a target base station in the communication network within a Radio Access Network (RAN) Based Notification Area (RNA) associated with the apparatus in a Radio Resource Control (RRC) inactive state.

3. The apparatus of claim 1, wherein the payload data is provided to the selected one of the one or more second access network entities as part of a 5G New Radio (NR) Small Data Transmission (SDT) without anchor relocation procedure.

4. The apparatus of claim 1, wherein the one or more parameters for generating the security key comprise a target base station identifier.

5. The apparatus of claim 1, wherein generating the authentication token is further based on one or more parameters previously allocated to the apparatus by the first access network entity for signaling in the inactive state.

6. The apparatus of claim 5, wherein the one or more parameters previously allocated to the apparatus by the first access network entity for signaling for Small Data Transmission (SDT) in the inactive state comprise at least one of an Inactive Radio Network Temporary Identifier (I-RNTI) parameter, a Cell Radio Network Temporary Identifier (C-RNTI) parameter, and a source Physical Cell ID (PCI) parameter.

7. The apparatus of claim 5, wherein the one or more parameters allocated to the apparatus for signaling in the inactive state are received in a Radio Resource Control (RRC) release message.

8. The apparatus of claim 7, wherein the RRC release message is received at the apparatus when transitioning to the inactive state.

9. The apparatus of claim 7, wherein the RRC release message is received at the apparatus following a 5G New Radio (NR) Small Data Transmission (SDT) without anchor relocation procedure.

10. The apparatus of claim 1, wherein the authentication token is further generated at least in part on at least one of: a target cell identifier parameter; a Cell Radio Network Temporary Identifier (C-RNTI) parameter; and a source Physical Cell ID (PCI) parameter.

11. An apparatus comprising:
at least one processor;
at least one memory including computer program code;
the at least one memory and the computer program code being configured to, with the at least one processor, cause the apparatus at least to:
generate, for user equipment in a communication network operatively coupled to a first access network entity, one or more security keys corresponding to one or more second access network entities for use in resuming transmission of payload data to the apparatus, each of the one or more security keys being associated with user equipment in the communication network and a selected one of the one or more second access network entities in the communication network and being utilizable for resuming transmission of the payload data to the first access network entity in the communication network via the selected one of the one or more second access network entities while the user equipment is connected to the communication network in an inactive state;
provide, to the user equipment, a configuration message comprising (i) identities of the one or more second access network entities, (ii) one or more parameters for deriving the one of the one or more security keys associated with each of the one or more second access network entities, and (iii) instructions for using at least one of the one or more security keys when generating an authentication token that is provided to at least one of the one or more second access network entities to enable authentication of the user equipment by said at least one of the one or more second access network entities prior to resuming the transmission of the payload data to the apparatus via said at least one of the one or more second access network entities; and
provide, to said at least one of the one or more second access network entities, at least one of the one or more generated security keys for said at least one of the one or more second access network entities and an identity of the user equipment associated with the generated security key.

12. The apparatus of claim 11, wherein the first access network entity comprises an anchor base station in the communication network, and the one or more second access network entities comprise respective target base stations in the communication network within a Radio Access Network (RAN) Based Notification Area (RNA) associated with the user equipment in a Radio Resource Control (RRC) inactive state.

13. The apparatus of claim 11, wherein the identity of the user equipment comprises an Inactive Radio Network Temporary Identifier (I-RNTI) parameter.

14. The apparatus of claim 11, wherein the one or more parameters for deriving the one or more security keys are provided to the user equipment as part of a Radio Resource Control (RRC) release message sent to the user equipment.

15. The apparatus of claim 11, wherein the generated security key for said at least one of the one or more second access network entities is provided to said at least one of the one or more second access network entities prior to the user equipment initiating a 5G New Radio (NR) Small Data Transmission (SDT) without anchor relocation procedure with said at least one of the one or more second access network entities belonging to a Radio Access Network (RAN) Based Notification Area (RNA) associated with the user equipment in a Radio Resource Control (RRC) inactive state.

16. The apparatus of claim 11, wherein the generated security key for said at least one of the one or more second access network entities is provided to said at least one of the one or more second access network entities as part of a 5G New Radio (NR) Small Data Transmission (SDT) without anchor relocation procedure with said at least one of the one or more second access network entities.

17. An apparatus comprising:
at least one processor;
at least one memory including computer program code;
the at least one memory and the computer program code being configured to, with the at least one processor, cause the apparatus at least to:
receive, from a first access network entity in a communication network, a user equipment identity and a security key generated for the user equipment for use in resuming transmission of payload data towards the first access network entity;
receive, from the user equipment connected to the communication network in an inactive state, an authentication token and the payload data for transmission to the first access network entity;

verify the authentication token received from the user equipment utilizing the received security key; and provide, to the first access network entity, the payload data responsive to successful verification of the authentication token.

18. The apparatus of claim 17, wherein the first access network entity comprises an anchor base station in the communication network, and the apparatus comprises a second access network entity comprising a target base station in the communication network within a Radio Access Network (RAN) Based Notification Area (RNA) associated with the user equipment in a Radio Resource Control (RRC) inactive state.

19. The apparatus of claim 17, wherein the payload data is received as part of a 5G New Radio (NR) Small Data Transmission (SDT) without anchor relocation procedure.

20. The apparatus of claim 17, wherein the at least one memory and the computer program code being configured to, with the at least one processor, further cause the apparatus to:

receive, from the first access network entity, one or more parameters allocated to the user equipment by the first access network entity for signaling in the inactive state; and utilize the one or more parameters allocated to the user equipment by the first access network entity for signaling in the inactive state in verifying the authentication token received from the user equipment.

* * * * *